US012583669B2

(12) United States Patent
Cox

(10) Patent No.: US 12,583,669 B2
(45) Date of Patent: Mar. 24, 2026

(54) LID LOCK FOR WASTE RECEPTACLE

(71) Applicant: Litter Lock Pty Ltd, Jan Juc (AU)

(72) Inventor: Colin Cox, Jan Juc (AU)

(73) Assignee: Litter Lock Pty Ltd (AU)

( * ) Notice: Subject to any disclaimer, the term of this patent is extended or adjusted under 35 U.S.C. 154(b) by 18 days.

(21) Appl. No.: 18/708,247

(22) PCT Filed: Nov. 11, 2022

(86) PCT No.: PCT/AU2022/051351
§ 371 (c)(1),
(2) Date: May 8, 2024

(87) PCT Pub. No.: WO2023/087049
PCT Pub. Date: May 25, 2023

(65) Prior Publication Data

US 2025/0011076 A1 Jan. 9, 2025

(30) Foreign Application Priority Data

Nov. 17, 2021 (AU) ................................ 2021903698

(51) Int. Cl.
*B65F 1/16* (2006.01)
*B65F 1/14* (2006.01)
*B65F 3/00* (2006.01)

(52) U.S. Cl.
CPC .......... *B65F 1/1615* (2013.01); *B65F 1/1473* (2013.01); *B65F 1/1623* (2013.01);
(Continued)

(58) Field of Classification Search
CPC .... B65D 2251/1075; B65D 2251/1058; B65F 1/1615; B65F 1/1473; B65F 1/1623;
(Continued)

(56) References Cited

U.S. PATENT DOCUMENTS 5,772,264 A * 6/1998 Bettenhausen ....... B65F 1/1615 292/130
6,808,080 B2 * 10/2004 Spiers .................. B65F 1/1615 220/908

(Continued)

FOREIGN PATENT DOCUMENTS

DE 19633520 A1 2/1998

OTHER PUBLICATIONS

Vahid Etminan Farooji; International Search Report and Written Opinion; International Application No. PCT/AU2022/051351; Nov. 11, 2022; Australian Patent Office; Woden ACT, Australia.

*Primary Examiner* — Kareen K Thomas
(74) *Attorney, Agent, or Firm* — Stevens & Showalter LLP

(57) ABSTRACT

A lid lock for a waste receptacle having a lid mounted on a hinge and having a closed configuration with the lid covering an opening of the waste receptacle and an open configuration with the lid pivoted away from the opening to allow access to the receptable. The lid defines a pivot path about the hinge. The lid lock includes a lever arm comprising a first portion configured to inhibit pivoting of the lid away from the opening and a second portion configured to be actuated by an automated pick-up arm of a wasted disposal vehicle. It further includes a bin mount co-operable with the lever arm to form a lever action and biasing means configured to bias the lever arm into a position that interferes with movement of the lid from the closed configuration to the open configuration.

19 Claims, 4 Drawing Sheets

(52) U.S. Cl.
CPC ............ *B65F 1/1646* (2013.01); *B65F 3/005* (2013.01); *B65F 2210/148* (2013.01)

(58) Field of Classification Search
CPC .. B65F 1/1646; B65F 3/005; B65F 2210/148; B65F 2003/023; B65F 2003/0289; B65F 1/122
See application file for complete search history.

(56) References Cited

U.S. PATENT DOCUMENTS

| | | | | |
|---|---|---|---|---|
| 7,128,515 | B2 * | 10/2006 | Arrez ...................... | B65F 3/041 414/408 |
| 8,408,607 | B2 * | 4/2013 | Michael ................ | B65F 1/1615 414/407 |
| 10,526,137 | B2 * | 1/2020 | Dworkin ............... | B65F 1/1615 |
| 2002/0030595 | A1 * | 3/2002 | Kasik ........................ | B65F 1/14 340/568.1 |
| 2012/0006838 | A1 * | 1/2012 | Michael ................ | B65F 1/1615 220/730 |
| 2014/0190982 | A1 | 7/2014 | Speed | |
| 2015/0001221 | A1 | 1/2015 | Spahmann | |

* cited by examiner

LID LOCK FOR WASTE RECEPTACLE

TECHNICAL FIELD

The present invention relates to waste receptacles having a body for receiving waste and a lid connected to the body by a hinge. The invention has particular, although not exclusive application, to waste receptacles known generally as wheelie bins. More specifically, the invention relates to a lid lock for such waste receptacles.

BACKGROUND

Wheelie bins are an integral part of the domestic waste disposal system in Australia and in many other countries. Such widespread adopting of wheelie bins has led to creation of automated curbside pickup systems for waste disposal vehicle. The disposal systems utilize an arm that grabs and lifts a wheelie bin from an upright position, tilts it forward through horizontal and into an inverted position over an opening into the vehicle's waste compactor. These automated curbside pickup systems attached commercial waste disposal vehicles are used worldwide.

For the system of automated waste pickup to work effectively, the lid of the wheelie bin must be unsecured to ensure the bin contents can be easily evacuated when tipped upside down. An unintended result of leaving the wheelie bin lid unsecured is the potential release of the bins contents into the environment. This may be the result of wind blowing the lid open, the bin being knocked over by any one of a variety of means (including wind, vehicles and animals), foraging animals (e.g. dogs, birds and foxes) opening the lid or unsecured rubbish escaping due to over filling of the bin.

Some of the problems associated with rubbish escaping the collection bins and entering the environment are:

considerable costs to local government to collect the loose rubbish,
pollution to the environment;
harm to animals; and
unsightly mess.

Two solutions currently in the market rely solely on a locking mechanism that unlocks when the bin is inverted.

One has a gravity-operated latch. Specifically, the latch is a free-swinging latch what changes position as the bin is lifted an inverted. In the normal upright position, the latch is oriented to catch on a frame such that the catching prevents opening of the lid. As the bin is lifted and inverted, the latch swings away from the frame so that opening of the lid can occur without the latch catching on the frame. This solution relies on the free-swinging movement of the latch. However, the potential for this solution to fail due to dirt, rubbish or similar obstructions preventing the moving parts (i.e. free swinging of the latch) from operating appear high. Trials by the Surf Coast Shire Council in Australia confirmed this. The design of the latch and the way it operates makes it susceptible to unlocking the lid when the bin falls forward into a substantially horizontal orientation. Specifically, the latch swings free of the frame as the bin falls forward so that the lock disengages before the bin hits the ground. In doing so, the lid unlocks and the contents of the bin may spill out.

An alternative solution comprises a resilient link between the lid and body of the bin. The link is fitted to the lid and includes a resilient lug that is hooked over a lip on the body of the bin. The resilient link relies on gravity to create enough momentum within the bins contents to causes the resilient lug to deform and disengage from the body, thereby unlocking the lid and allowing the bin to be emptied. This solution relies on the resilient lug being flexible enough to break the connection between the lid and the body. However, if the bin was overloaded, and a force must be applied to hook the lug over the lip to engage the "lock", the pressure from the overloaded contents pressing upwardly on the lid could easily disengage the resilient lug and therefore render the lock useless. Furthermore, if the bin were to be knocked over, the shifting of the contents inside the bin could, and probably would, disengage the resilient lug and unlock the lid from the body. Furthermore, this solution was trialed by the Surf Coast Shire Council and was found to fail due to the birds easily disengaging the lock. As a result, birds were opening bin lids and transferring the bin contents into the environment.

The above references to the background art do not constitute an admission that the art forms a part of the common general knowledge of a person of ordinary skill in the art. The above references are also not intended to limit the application of the apparatus and method as disclosed herein.

SUMMARY OF THE DISCLOSURE

In a first aspect, there is provided a lid lock for a waste receptacle having a lid mounted on a hinge and comprising a closed configuration with the lid covering an opening of the waste receptacle and an open configuration with the lid pivoted away from the opening to allow access to the receptable, the lid defining a pivot path about the hinge, the lid lock comprising:

(a) a lever arm comprising a first portion configured to inhibit pivoting of the lid away from the opening and a second portion configured to be actuated by an automated pick-up arm of a wasted disposal vehicle; and
(b) a bin mount co-operable with the lever arm to form a lever action; and
(c) biasing means configured to bias the lever arm into a position that interferes with pivotal movement of the lid from the closed configuration to the open configuration.

In a second aspect, there is provided a lid lock for a waste receptacle having a lid mounted on a hinge and comprising a closed configuration with the lid covering an opening of the waste receptacle and an open configuration with the lid pivoted away from the opening to allow access to the receptable, the lid lock comprising a first portion configured to inhibit pivoting of the lid away from the opening and a second portion configured to be actuated by an automated pick-up arm of a wasted disposal vehicle and wherein the first portion is linked to the second portion such that actuation of the second portion causes displacement of the first portion from interfering with the lid, thereby enabling the lid to pivot away from the opening to allow access to the receptable.

The first portion and the second portion may form a lever arm.

The lid lock includes a bin mount that may be co-operable with the lever arm to form a lever action.

The lid lock may include biasing means configured to bias the lever arm into a position that interferes with movement of the lid from the closed position to the open position.

The lever arm may be integrally formed with the bin mount to form the lever action.

The lever arm may include a mounting for coupling the lever arm to the bin mount to form the lever action.

The mounting may be couplable with the bin mount by passing through an opening in the bin mount.

The mounting may be couplable with the bin mount by spindle pins

The biasing means may comprise a spring which is configured to interact with the bin mount and the lever arm.

The lid lock may include an abutment configured to inhibit pivoting of the lid about its hinge from the closed configuration to the open configuration.

The lid lock may include a segment configured to displace the first portion as the lid pivots from the open configuration to the closed configuration, thereby enabling the lid to move past the first portion from the open configuration to the closed configuration.

In one embodiment, the abutment and the segment may comprise a lid mount portion that is fixable to the lid to interact with the first portion.

The first portion may include a catch which is configured to interact with the abutment of the lid mount portion to inhibit pivoting of the lid about its hinge from the closed configuration to the open configuration.

In another embodiment, the first portion may include the abutment and the segment, whereby the abutment is configured to interact with a top surface of the lid to inhibit pivoting of the lid about its hinge from the closed configuration to the open configuration.

The segment may be configured to extend into the pivot path to interact with the lid.

The segment may be a ramp or a roller.

The biasing means may be selected to enable displacement of the first portion outside the pivot path by pivoting of the lid under the influence of gravity.

The second portion may be configured to be clamped against the side of the receptable by the gripping action of the pick-up arm.

The first portion may be configured to be relatively rigid compared to the second portion.

The second portion may decrease in rigidity away from the mounting.

The second portion may include a reinforcing rib which decreases in size from the mounting to a position away from the mounting.

The second portion is flexible to enable a portion of its length to be pressed against the exterior of the waste receptacle when the lid lock is actuated by an automated pick-up arm of a wasted disposal vehicle.

The second portion is flexible to enable at least 20% of its length from the mounting to the remote end of the second portion to be pressed against the exterior of the waste receptacle when the lid lock is actuated by an automated pick-up arm of a wasted disposal vehicle.

The second portion is flexible to enable at least 30% of its length from the mounting to the remote end of the second portion to be pressed against the exterior of the waste receptacle when the lid lock is actuated by an automated pick-up arm of a wasted disposal vehicle.

The second portion is flexible to enable at least 40% of its length from the mounting to the remote end of the second portion to be pressed against the exterior of the waste receptacle when the lid lock is actuated by an automated pick-up arm of a wasted disposal vehicle.

The second portion is flexible to enable at least 50% of its length from the mounting to the remote end of the second portion to be pressed against the exterior of the waste receptacle when the lid lock is actuated by an automated pick-up arm of a wasted disposal vehicle.

The second portion may be flexible to enable at least 60% of its length from the mounting to the remote end of the second portion to be pressed against the exterior of the waste receptacle when the lid lock is actuated by an automated pick-up arm of a wasted disposal vehicle.

The second portion may have curved form between the mounting and a remote end of the second portion, whereby the spacing between the mounting and the remote end is less than the distance along a surface of the second portion between the mounting and the remote end.

The curved form may be bowed in a direction generally opposite to the direction that the abutment and the segment extend from the first portion.

The first portion may comprise a strip which joins with the mounting and the reinforcing rib is orthogonal to the strip.

When the lid lock may be fitted to a waste receptacle, the spacing between the mounting and the waste receptacle is less than the spacing between an end of the second portion, that is remote from the mounting, and the waste receptacle.

The first portion may have a first tangent line extending longitudinally of the first portion from the mounting and second portion has a second tangent line extending longitudinally of the second portion from the mounting and an angle between the first tangent line and the second tangent line on a side of the lever arm that is opposite to the bin mount is less than 180°. The angle between the first tangent line and the second tangent line may be less than 180° and more than 140°.

The second portion may be curved in the longitudinal direction toward the bin mount side of the lever arm.

The biasing means may be part of the lever arm.

The biasing means may be part of the second section of the lever arm.

The bin mount may comprise a bracket that is configured to rotatably mount the lever arm to a waste receptacle.

The waste receptacle may be a wheelie bin.

The lid lock may be mountable to an exterior of a waste receptacle, whereby the first portion is configured to interact with the exterior of the lid.

In a third aspect there is provided a waste receptacle comprising:

(a) a lid mounted on a hinge and comprising a closed configuration with the lid covering an opening of the waste receptacle and an open configuration with the lid pivoted away from the opening to allow access to the waste receptable, the lid defining a pivot path about the hinge and;

(b) a lid lock comprising any one or more of the features disclosed above in the first and/or second aspects.

Although various features are disclosed above in relation to one or more aspect, it will be appreciated that one or more features of one aspect may be combined with other aspects to arrive at additional embodiments. It follows that disclosure of features in the preceding statements should not be interpreted as meaning that the features are limited in application to the aspects in respect of which they are disclosed.

Ordinal references (e.g. first, second, third) to aspects disclosed above serve to differentiate aspects from one another only. The ordinal references are not to be interpreted as the order of importance of the aspects.

BRIEF DESCRIPTION OF THE DRAWINGS

Notwithstanding any other forms which may fall within the scope of the lid lock and the waste receptacle as set forth in the Summary, specific embodiments will now be described, by way of example only, with reference to the accompanying drawings in which.

DETAILED DESCRIPTION

Figure 1:
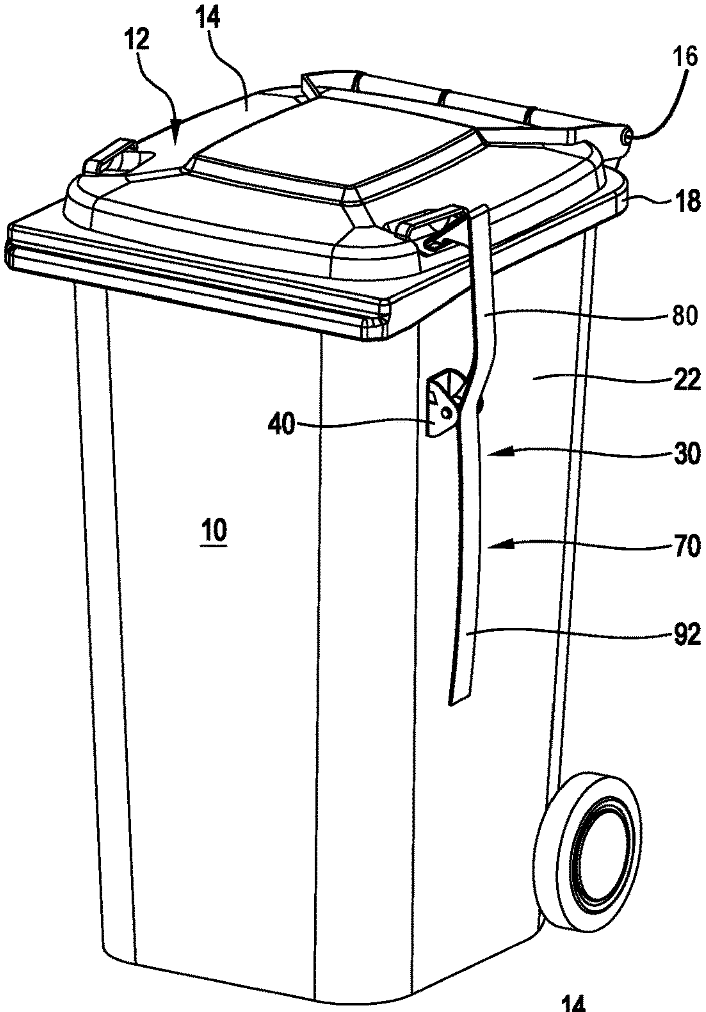
FIG. 1 is an oblique view of a lid lock according to an embodiment of the invention when fitted to a wheelie bin and in a locked position.

Embodiments will now be described in the following text which includes reference numerals that correspond to features illustrated in the accompanying Figures. To maintain clarity of the Figures, however, all reference numerals are not included in each Figure.

Figure 2:
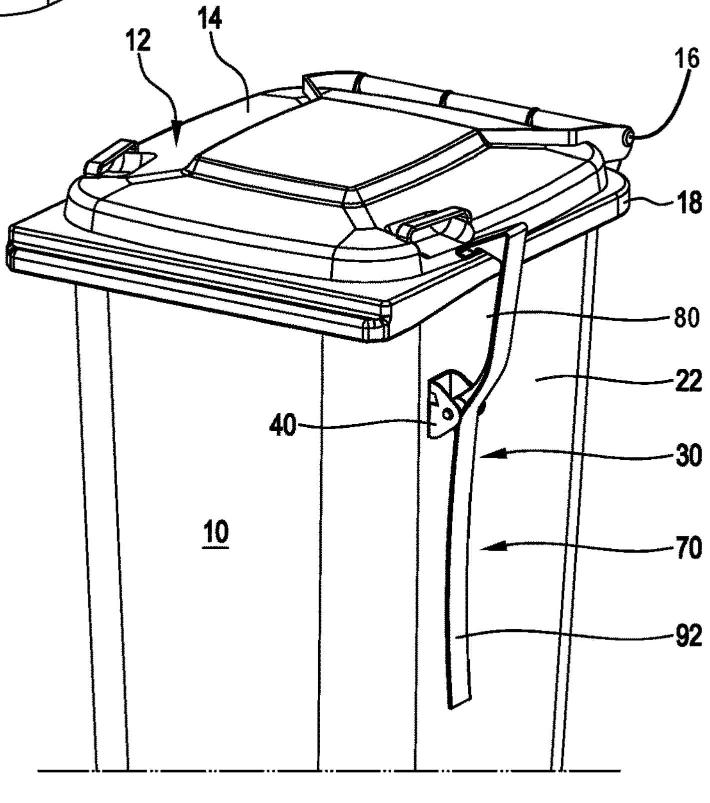
FIG. 2 is an oblique view of the lid lock shown in FIG. 1 when fitted to a wheelie bin and in an unlocked position.

One embodiment of a lid lock 30 is shown in FIGS. 1 and 2 fitted to a waste receptacle, in the form of a wheelie bin 10.

The wheelie bin 10 comprises a body 20 defining a volume for receiving waste and includes a side wall 22. The wheelie bin 10 further includes a lid 12 which is hingeably connected to the body 20 to define a path through which the lid 12 pivots about a hinge 16. As described above, wheelie bins 10 of the form shown in FIGS. 1 and 2 are used widely throughout Australia and the world and therefore, a skilled person would be familiar with wheelie bins 10.

Figure 3:
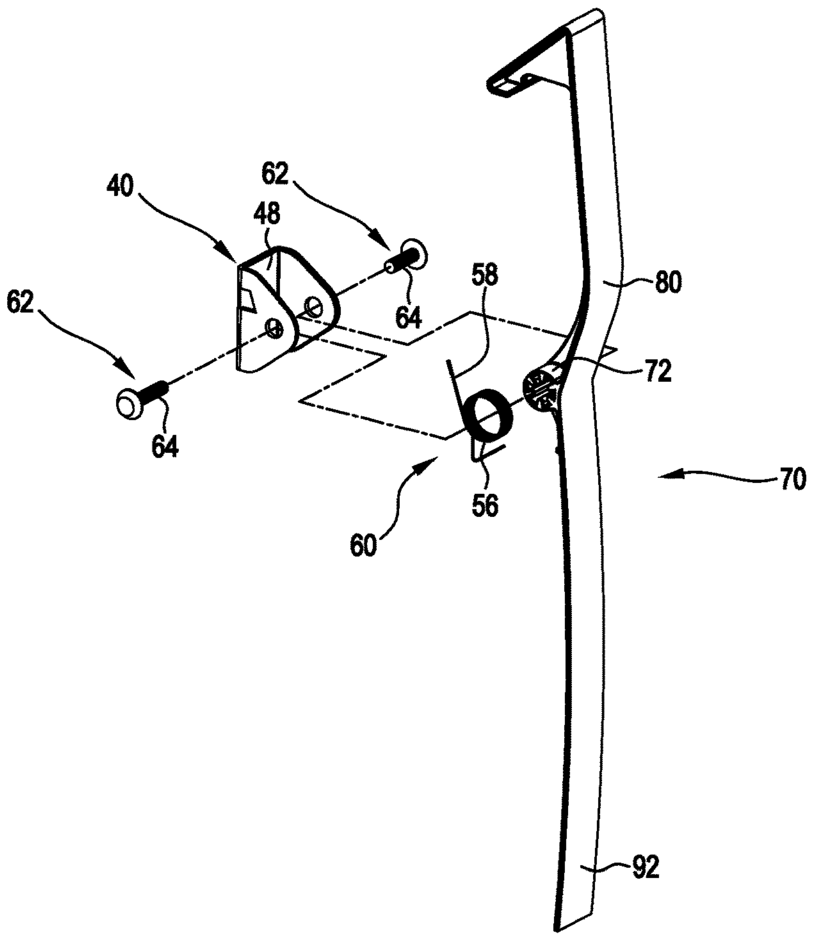
FIG. 3 is an exploded oblique view of the lid lock shown in FIG. 1.

As shown in FIGS. 1 and 2, the lid lock 30 comprises a mount, in the form of a bracket 40 and a lever arm 70. FIG. 3 shows the various components of the lid lock 30. The lid lock 30 is configured for mounting to the exterior of a bin so that the lid lock 30 interacts with the exterior of the lid 12. Exterior mounting enables actuation of the bin lock 30 by an automated pick-up arm 24 of a wasted disposal vehicle (see FIG. 8).

Figure 4A:
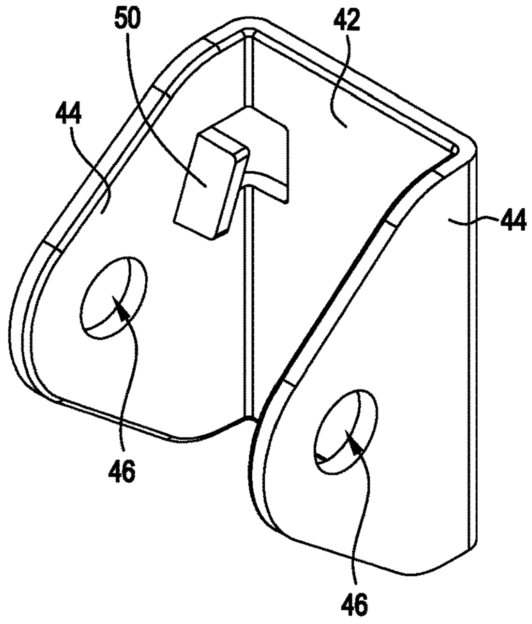
FIG. 4A is an oblique view from above of the mount shown in FIGS. 1 to 3.

The bracket 40 (also shown in FIG. 4A) comprises a base 42 and a pair of parallel wings 44 extending from the base 42. The wings 44 include apertures 46 spaced from the base. One wing 44 includes a spring tab 50. The spring tab 50 projects into the space between the wings and is disposed on the wing 44 between base 42 and the aperture 46 in that wing 44.

Figure 4B:
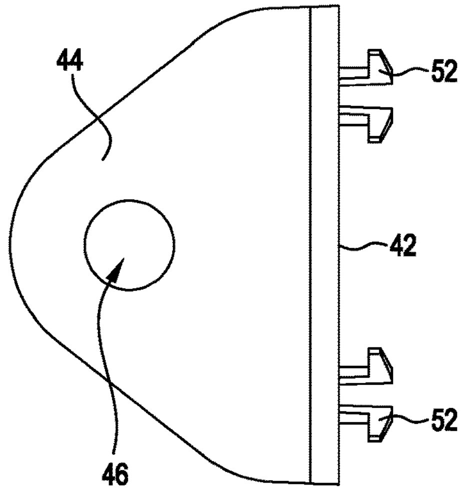
FIG. 4B is a side view of an alternative mount.

In this embodiment, the base 42 includes 4 holes through which fasteners are passed to fix the bracket 42 the side wall 22 of the wheelie bin 10. The fasteners may be screws, rivets, bolts or the like. This embodiment may include a backing plate (not shown) that is fitted to the inside of the side wall 22 to coincide with the base 42. The fasteners pass through the base 42, side wall 22 and backing plate and are adjusted to clamp the side wall 22 between the base 42 and the backing plate. The backing plate reduces the chance of fastener pull-out through the side wall 22 by spreading pulling forces on the fasteners over a larger area of the side wall. In an alternative embodiment shown in FIG. 4B, the base 42 may include a pair of snap fit projections 52 extending away from the base in a direction opposite to the direction of the wings 44. In this embodiment, each snap-fit projection 53 comprises a flexible stem and a return shoulder the bracket 40 is fixed to the side wall 22 by forming holes in the side wall 22 at locations to receive the snap-fit projections 52 and by pushing the snap-fit projections 52 through the holes in the side wall 22 so that the flexible stems deflect (i.e. the shoulders are pushed toward each other) to enable the shoulders to pass through the holes but return to their original arrangement once through the holes to lock against the inside of the side wall 22. The effect is that the shoulders spread and engage the inner surface of the side 22. The square shape of the shoulders prevents them from pulling back through holes.

The lever arm 70 includes a mounting, in the form of a sleeve 72, and a lock portion 80 and a trigger portion 92. The sleeve 72 acts as a rotational axle of the lever arm 70. It is mounted to the bracket 40 by spindle pins 62 which pass through the apertures 46 and into an internal space of the sleeve 72. Six ridges 74 project radially inwardly into the internal space of the sleeve 72 and are equally spaced about the sleeve 72. The spacing between the ridges 74 defines channels into which complimentary ridges 64, which project radially outwardly on the spindle pins 62, slide into. The shape and dimensions of the ridges 64 and the ridges 74 are selected to provide a friction fit which secures the spindle pins 62 within the sleeve 72, thereby securing the lever arm 70 to the bracket 40 and allowing the lever arm 70 to rotate relative to the bracket 40.

On one side of the lever arm 70, the sleeve 72 extends beyond the lateral sides of the block portion 80 and the trigger portion 92 to define a boss portion 76. A coil spring 56 fits around the boss portion 76 to hold the coil spring 56. The coil spring 56 is formed from the length of wire which extends to a terminal arm 58 at one end and a torsion arm 60 at the other end. The terminal arm 58 is seated behind the spring tab 50. The torsion arm 60 includes a section which extends parallel to the axis of the coil spring 56 and is seated within a sleeve 96 of the trigger portion 92. The coil spring 56, including the terminal arm 58 and the torsion arm 60, are configured to bias the lock portion 80 toward the bracket 40 when the lid lock 30 is assembled.

The lock portion 80 extends from the sleeve 72 and includes a bend 82. The bend 82 in the direction with which the lock portion 80 initially extends from the sleeve 72 enables the rotational axis of the lever arm 70 (i.e. the sleeve 72 in this embodiment) to be placed in relatively close proximity to the side wall 22 and still have the lock portion 80 extend around the rim 18 and into the pivot path of the lid 12. The upper end of the lock portion 80 includes an abutment 84. The abutment 84 is configured to interact with the lid 12 to prevent movement of the lid 12 from a closed position to an open position. More specifically, the abutment 84 is oriented generally parallel to the top surface 14. This ensures that lifting of the lid 12 from the closed position doesn't impart a significant lateral force vector which could potentially displace the lock portion 80 from the pivot path of the lid 12. The closed position of the lid 12 is shown in FIGS. 1 and 2 where the lid 12 rests on the rim 18.

The abutment 84 interacts with the exterior of the lid 12. The interaction results from being located within rotational path of the lid 12 and from being shaped to avoid lateral displacement of the lock portion 80 by movement of the lid 12 from the closed portion toward the open position. The exterior location of the abutment 84 and its positioning in the rotational path of the lid 12 avoids the need for a separate catch formation to be installed on the wheelie bin 10 to interact with the abutment 84 for locking of the lid 12.

The upper end of the lock portion 80 further includes a segment, in the form of a ramp 86, which enables the lid 12 to return to the closed position under the influence of gravity when the lock portion 80 is located in the pivot path of the lid 12. The ramp 86 is positioned and angled to enable the weight of the lid 12 to bear against the ramp 86 and push the lock portion 80 laterally outwardly of the pivot path of the lid 12. The spring constant of the spring coil 56 is selected so that the spring force imparted by the coil spring 86 is less than the lateral force vector on the ramp 86 due to the weight of the lid 12 bearing downwardly on the ramp 86. The angle of inclination of the ramp 86 relative to the direction of movement of the lid 12 allows the lid 12 to slide across the surface of the ramp 86. In doing so, the lock portion 80 is pushed out of the pivot path of the lid 12 and, therefore, allows the lid 12 to move to the closed position as shown in FIG. 1.

Figure 5:
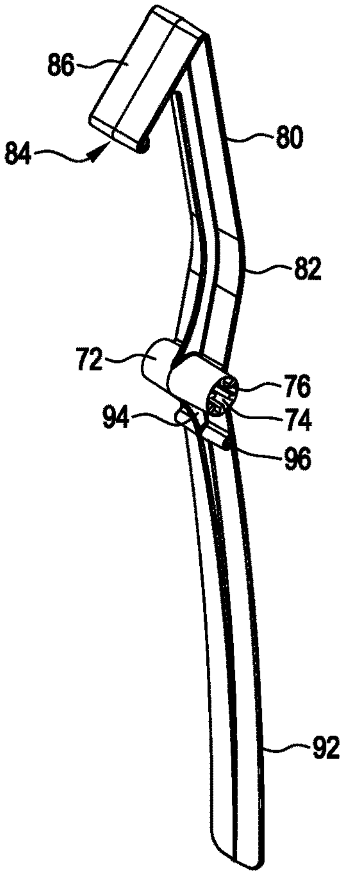
FIG. 5 is an oblique view of the lever arm of the lid lock shown in FIGS. 1 and 3.
Figure 6:
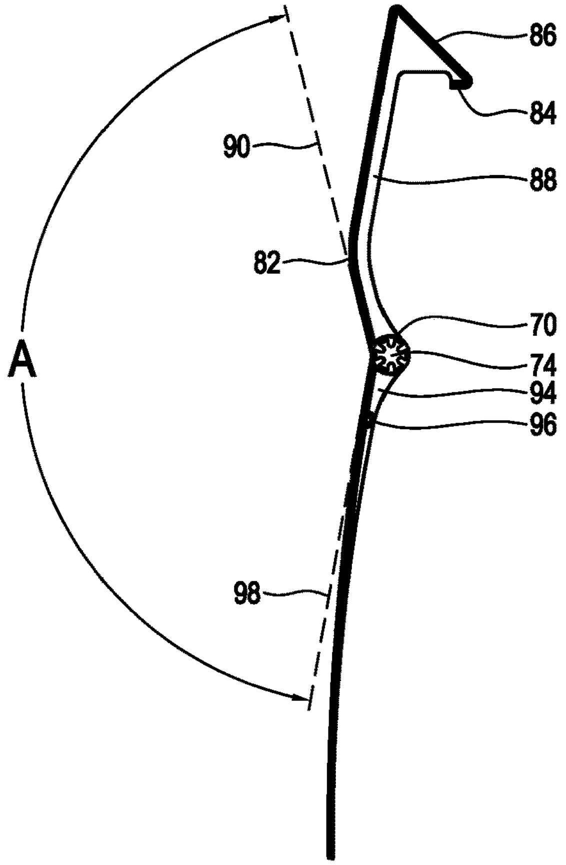
FIG. 6 is a side plan view of the lever arm of the lid lock shown in FIG. 4.

The lock portion 80 further includes a first rib 88 which reinforces the lock portion 80. The first rib 88 increases the rigidity of the lock portion 80 to reduce the extent to which it deflects when forces are applied to the lock portion 80 through the abutment 84 or the ramp 86. As shown in FIGS. 5 and 6, the first rib 88 extends from the sleeve 72 to the ramp 86 and the abutment 84.

Figure 8:
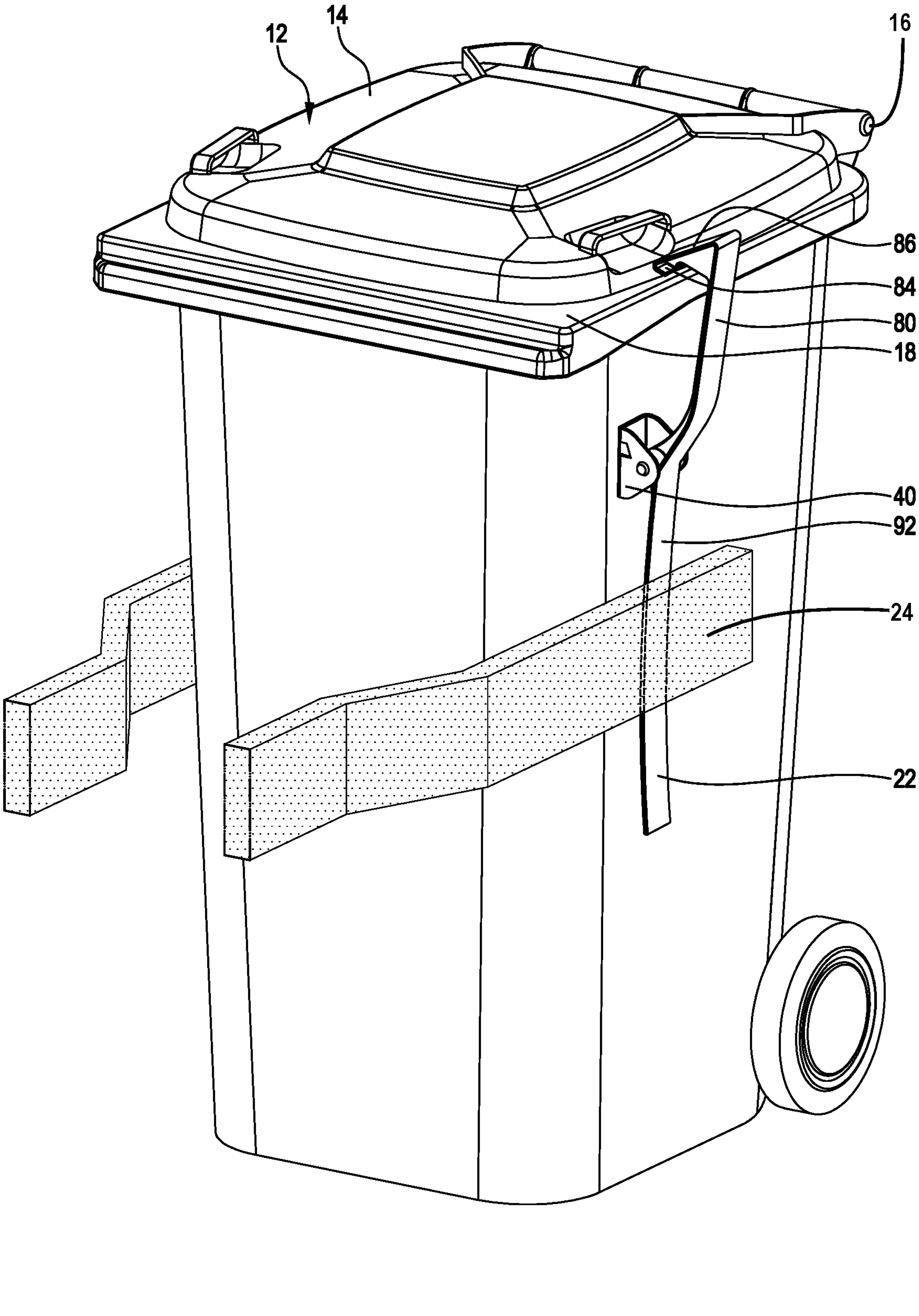
FIG. 8 is a front view of the lid lock in FIG. 1 when fitted to a wheelie bin and with the lever arm actuated to the unlocked position by an automated pick-up arm of a wasted disposal vehicle.

The trigger portion 92 extends from the sleeve 72 in a direction away from the lock portion 80. The trigger portion 92 is curved from the sleeve 72 to its remote end. The trigger portion 92 extends from the sleeve 72 by a distance that results in the trigger portion 92, when fitted to a wheelie bin 10, being within a region that is typically grasped by an automated arm of a waste disposal vehicle. The second reinforcing 94 tapers in dimension from the sleeve 72 to a position intermediate of the sleeve 72 and the remote end of the trigger portion 92. As shown in FIGS. 5 and 6, the second rib 94 extends r perpendicularly of the remainder of the trigger portion 92. Additionally, the second rib 94 reduces in size from the sleeve 72 to the intermediate position. The intermediate position may be halfway between the sleeve 72 and the remote end. Alternatively, the intermediate position may be between the sleeve 72 and halfway to the remote end from the sleeve 72. The reduction in size of the second rib 94 causes the trigger portion 92 to be more flexible away from the sleeve 72 so that a length of the trigger portion 92 can be pressed against the side 22 when it is grasped by the automated arm of the waste disposal truck. This flexing is shown in FIG. 8 where a length of the trigger portion is pressed against the side 22 of the wheelie bin 10.

The curvature of the trigger portion 92 ensures that the trigger portion 92 remains within the gripping width of an automated arm of the waste disposal truck. If the trigger portion 92 were to extend in a straight line away from the sleeve 72 (i.e. follow a second tangent line 98) there is a risk that the width of the wheelie bin 10 plus the spacing of the trigger portion 92 from the side 22 will exceed the maximum grip width of an automated arm. The curvature of the trigger portion 92, therefore, ensures that the spacing of the trigger portion 92 from the side is compatible with automated arms and, at the same time, enables sufficient travel of an upper part of the trigger portion 92, when clamped to the side 22 of the wheelie bin by an automated arm. This travel is converted into an equivalent travel of the lock portion 80 so that it clears the pivot path of the lid 12. This travel is assisted by the trigger portion 92 extending from the sleeve 72 at an angle A relative to the lock portion 80 that is less than 180°. This can be seen in FIG. 6 where a first tangent line 90 extending tangentially of the lock portion 80 from the sleeve 72 and the second tangent line extending tangentially of the trigger portion 92 from the sleeve 72 have an angle A, on the side of the lever arm 70 that is away from the bracket 40, between them that is less than 180°. The angle A may be more than 140° and less than 180°.

Figure 7:
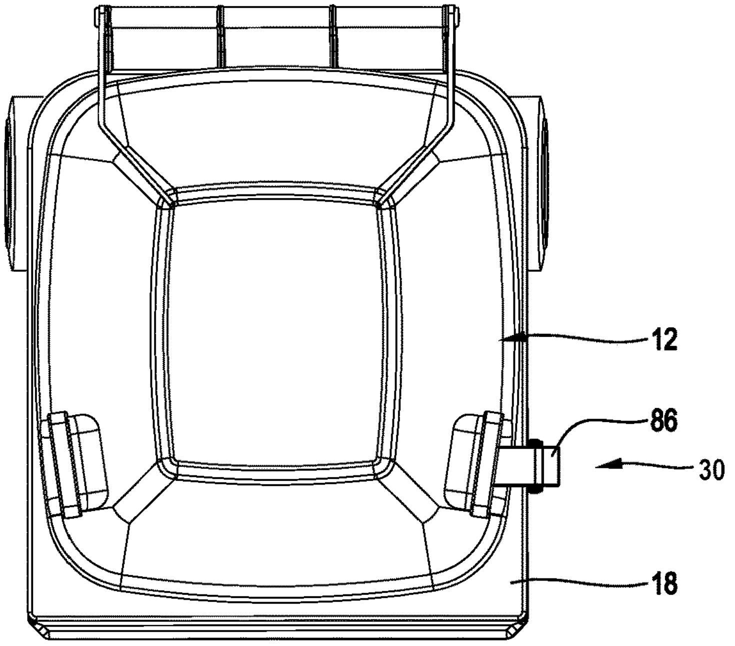
FIG. 7 is a top view of the lid lock in FIG. 1 in the locked position.

FIGS. 1 and 7 show the lid lock 30 in a lock position in which the abutment 84 extends into the pivot path of the lid 12. When the lid 12 is already closed, attempts to open the wheelie bin 10 by pivoting the lid 12 about the hinge will result in a top surface 14 of the lid 12 contacting the abutment 84, thereby preventing further pivoting of the lid 12. Opening the wheelie bin 10 from this lock position involves manually pulling the lock portion 80 out of the pivot path and then lifting the lid 12 at least above the level of the lock portion 80. Such manual opening technique may be used by a person when placing waste inside the wheelie bin 10. Alternatively, the lid lock 30 is unlocked when an automated arm of a waste disposal truck grips the bin 10 and, in doing so, clamps the trigger portion 92 against the side 22. This clamping rocks the lever arm 70 about its rotational axis and, in doing so, causes the lock portion 80 to move out of the pivot path of the lid 12, thereby allowing the lid 12 to swing freely about the hinge when the bin 10 is inverted over the waste disposal truck for emptying.

It will be appreciated that if the wheelie bin 10 is blown over or knocked over, the lid lock 30 remains operable to retain the lid in the closed position. In other words, the bias effect on the lock portion 80 isn't affected by the orientation of the wheelie bin 10 so the lock portion 80 will remain in the pivot path of the lid 12 and will serve to retain the lid 12 in the closed position.

A variation of the lid lock 30 described above includes a friction-enhancing portion between the abutment 84 and the top surface 14 of the bin lid 12. In this regard, the lid lock 30 may include a friction-enhancing pad which is fixable to the top surface 14 at a location that coincides with the point where the abutment 84 contacts the top surface 14. The pad may be a rubber material. The rubber material is selected to reduce or prevent slippage between the abutment 84 and the top surface in the ordinary usage of the lid lock 30, including when the wheelie bin 10 is knocked or blown over. The pad is fastened to the top surface 14 by one or more mechanical fasteners or by an adhesive or by a combination of both. In an alternative, the abutment 84 may incorporate one or more contact pads in a position that results in the one or more contact pads contacting the top surface when the lid lock 30 is in the closed position. The contact pads are retained with the abutment 84. Such retention may be by frictionally holding the one or more contact pads in one or more shaped recesses in the abutment 84, may be by fastening the one or more contact pads to the abutment 84 by one or more mechanical fasteners or may be by fixing the one or more contact pads to the abutment 84 by an adhesive or by a combination of these retention means.

While the bracket 40 in FIGS. 1, 2 and 8 is shown spaced a short distance from the rim 18, the distance may be reduced by locating the bracket 40 closer to the rim and by adopting an alternative lever arm (not shown). The alternative lever arm has a shorter lock portion 80, whereby the length reduction is in the portion between the bend 82 and the abutment 84. The alternative lever arm also has a longer trigger portion 92. Lengthening the trigger portion 92 increases the range of positions where the automated pick-up arm 24 can grab the wheelie bin 10 and release the lid lock 30. Aside from these differences, the alternative lever arm 70 has the same features of the lever arm 70 described above and shown in the figures.

Those skilled in the art of the present invention will appreciate that many variations and modifications may be made to the preferred embodiment without departing from the spirit and scope of the present invention.

For example, the lever arm 70 and the bracket 40 may be integrally formed with a line of weakness between them to enable a lever action between them. In such an embodiment, the sleeve 72 and spindle pins 62 are not required.

In an alternative embodiment, the bracket 40 may include an aperture through which the lever arm 70 extends and an inner rim of the aperture forms a fulcrum to enable a lever action between the lever arm 70 and the bracket. In this embodiment, the remote end of the trigger portion 92 is fastened to the side 22.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms. These terms, when used in reference to the lid lock throughout the specification, including the claims, refer to orientations relative to the normal operating orientation, i.e. when the lid lock is fitted to a waste receptacle in its upright orientation.

Furthermore, invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, for example, aspects of one embodiment may be combined with aspects of another embodiment to realize yet other embodiments. Further, each independent feature or component of any given assembly may constitute an additional embodiment.

The invention claimed is:

1. A lid lock for a waste receptacle comprising a lid mounted on a hinge and comprising a closed configuration with the lid covering an opening of the waste receptacle and an open configuration with the lid pivoted away from the opening to allow access to the receptacle, the lid lock comprising:
- a lever arm comprising:
  - a first portion comprising an abutment configured to inhibit pivoting of the lid away from the opening by interacting with a top surface of the lid when the lid lock is in a first position; and
  - a second portion configured to be actuated by an automated pick-up arm of a wasted disposal vehicle; and
- a mount co-operable with the lever arm to form a lever action;
- wherein the first portion is linked to the second portion such that actuation of the second portion causes displacement of the first portion from the first position to a second position in which the abutment does not inhibit pivoting of the lid, thereby enabling the lid to pivot from the closed configuration to the open configuration to allow access to the receptacle.

2. A waste receptacle comprising:
- a body defining an internal volume for receiving waste and having a top opening, the body comprising a side wall;
- a lid mounted on a hinge and comprising a closed configuration with the lid covering the opening of the waste receptacle and an open configuration with the lid pivoted away from the opening to allow access to the internal volume of the waste receptacle, the lid defining a pivot path about the hinge; and
- the lid lock of claim 1, the lid lock affixed to an external surface of the side wall.

3. The lid lock of claim 1, further comprising:
- biasing means configured to bias the lever arm into a position that interferes with pivotal movement of the lid from the closed configuration to the open configuration.

4. The lid lock of claim 3, wherein the biasing means comprises a spring.

5. The lid lock of claim 1, wherein the mount comprises a bracket that is configured to rotatably mount the lever arm to the waste receptacle.

6. The lid lock of claim 1, wherein the first portion comprises a segment configured to displace the first portion as the lid pivots from the open configuration to the closed configuration, thereby enabling the lid to move past the first portion when moving from the open configuration to the closed configuration.

7. The lid lock of claim 6, wherein the segment comprises a ramp located at a top surface of the first portion, wherein the ramp is angled to enable the weight of the lid to bear against the ramp as the lid pivots from the open configuration to the closed configuration to thereby push the first portion laterally outwardly of the pivot path of the lid.

8. The lid lock of claim 1, wherein the second portion is flexible to thereby enable a portion of its length to be pressed against an exterior surface of the waste receptacle when the second portion is actuated by the automated pick-up arm.

9. The lid lock of claim 1, wherein the first portion is relatively rigid compared to the second portion.

10. The lid lock of claim 1, wherein the second portion has a curved form between the mount and a remote end of the second portion, whereby the spacing between the mount and the remote end is less than the distance along a surface of the second portion between the mount and the remote end.

11. The lid lock of claim 10, wherein the second portion is bowed in a direction generally opposite to a direction that the abutment extends from the first portion.

12. The lid lock of claim 1, wherein the first portion comprises a first tangent line extending longitudinally of the first portion from the mount and the second portion comprises a second tangent line extending longitudinally of the second portion from the mount, and wherein an angle between the first tangent line and the second tangent line on a side of the lever arm that is opposite to the mount is less than 180°.

13. The lid lock of claim 12, wherein the angle between the first tangent line and the second tangent line is greater than 140°.

14. The lid lock of claim 1, wherein the mount comprises one or more holes for receiving fasteners for affixing the mount to the waste receptacle.

15. The lid lock of claim 1, wherein the mount comprises one or more snap fit projections projecting outwardly from a base of the mount, the one or more snap fit projections for cooperating with corresponding holes in a sidewall of the waste receptacle to thereby affix the mount to the waste receptacle.

16. The lid lock of claim 1, further comprising: a friction-enhancing portion located between the abutment and the top surface of the bin lid when the lid lock is in the first position.

17. The lid lock of claim 16, wherein the friction-enhancing portion comprises a friction-enhancing pad which is fixable to the top surface of the lid at a location that coincides with the point where the abutment contacts the top surface when the lid lock is in the first position.

18. The lid lock of claim 16, wherein the friction-enhancing portion comprises one or more contact pads positioned such that the one or more contact pads contact the top surface of the lid when the lid lock is in the first position.

19. The lid lock of claim 1, wherein actuation of the second portion comprises pressing of the second portion towards a side of the waste receptacle.

* * * * *